United States Patent [19]
Hodkin et al.

[11] Patent Number: 5,459,293
[45] Date of Patent: Oct. 17, 1995

[54] CRADLE ASSEMBLY FOR CIRCUIT INTERRUPTERS

[75] Inventors: George A. Hodkin; David G. Roberts; Trevor B. Marshall, all of Nottingham, England

[73] Assignee: Eaton Corporation, Cleveland, Ohio

[21] Appl. No.: 93,289

[22] Filed: Jul. 16, 1993

[51] Int. Cl.$^6$ ................................................ H01H 33/46
[52] U.S. Cl. ..................... 200/50 AA; 361/609
[58] Field of Search ............... 200/50 R–50 C; 361/605–610, 615, 634, 652

[56] References Cited

U.S. PATENT DOCUMENTS

| | | | |
|---|---|---|---|
| 2,615,101 | 10/1952 | Caswell | 200/50 |
| 4,315,115 | 2/1982 | Rexroad | 200/50 AA |
| 4,376,235 | 3/1983 | Milianowicz | 200/50 AA |
| 4,384,179 | 5/1983 | Milianowicz | 200/50 AA |
| 4,486,814 | 12/1984 | Ishikawa et al. | 361/339 |
| 5,036,427 | 7/1991 | Krom et al. | 361/339 |

Primary Examiner—A. D. Pellinen
Assistant Examiner—Michael A. Friedhofer
Attorney, Agent, or Firm—Martin J. Moran

[57] ABSTRACT

Cradle assembly comprises a breaker-engaging frame slidably coupled to an enclosure-engaging frame. The enclosure will have a rear wall provided with forwardly extending stationary terminals. The breaker will have rearwardly facing terminals aligned for engaging the stationary terminals. The rear wall of the enclosure is fixed relative to the side walls of the enclosure. The enclosure-engaging frame of the cradle assembly engages the side walls as the breaker is mounted to the breaker-engaging frame. The cradle assembly facilitates moving the breaker between a connected and disconnected position. In the connected position, the breaker terminals are engaged with the enclosure stationary terminals. In the disconnected position, the breaker terminals are disengaged and spaced from the stationary terminals.

5 Claims, 7 Drawing Sheets

CRADLE ASSEMBLY FOR CIRCUIT INTERRUPTERS

The present application is related to, concurrently owned and concurrently assigned with the following applications: (1) an application entitled "FLEXIBLE CONNECTOR FOR CIRCUIT INTERRUPTERS", by inventor Antonio I. Takiishi (attorney docket no. WE 57,200), and (2) another application entitled "DRIVE MECHANISM FOR CIRCUIT INTERRUPTERS", by inventors George A. Hodkin, David G. Roberts, and Trevor B. Marshall (attorney docket no. WE 57,654).

BACKGROUNDS OF THE INVENTION

1. Field of the Invention

The invention relates to the field of draw-out circuit interrupters, and in particular concerns a draw-out circuit interrupter cradle configuration with a number of interlocks in a compact and durable arrangement.

2. Prior Art

Known cradles for draw-out circuit interrupters support the draw-out circuit interrupters in a compartment of a stationary enclosure, cabinet or the like in a manner permitting both removable mounting of the interrupter and back and forth movement of operative elements that engage or disengage electrical conductors that terminate in the enclosure. An example is disclosed in U.S. Pat. No. 4,315,115—Rexroad.

The interrupter includes a stationary frame and a conductor mechanism having a stationary contact and a movable contact that can be brought together to bridge across the fixed conductors that terminate at the enclosure, and lead back to bus bars on the supply and load sides of a power distribution network. The conductive jumper bar is likewise retractable, and the interrupter mechanism thus makes or breaks an electrical circuit including the permanent terminals and the bus bars. The cradle also facilitates the procedures of mounting and demounting the interrupter in the compartment, in a modular manner.

Known cradles comprise an interrupter-engaging frame movably coupled to an enclosure-engaging frame. The interrupter-receiving compartment of the stationary enclosure typically defines a rear wall provided with openings permitting the forward extension of stationary terminals, also known as stabs. The stabs are arranged in opposite sets which oppositely extend to a power-consuming load and power-supplying source respectively. The stabs define plug structures that engage in rearwardly facing receptacle terminals aligned for releasable interconnection with the stabs. The interrupter is thereby plugged into the interrupter-engaging frame, while the enclosure-engaging frame removably engages the enclosure.

Moving the interrupter-engaging frame relative to the enclosure-engaging frame correspondingly causes the interrupter to move between the open and closed positions. Thus the enclosure-engaging frame can remain stationary as the interrupter mechanism moves to achieve electrically connected or disconnected relationships between the stabs.

Known cradle configurations are not particularly apt for operatively supporting large interrupter devices. It would be advantageous to provide a more compact arrangement capable of operating larger interrupters without correspondingly multiplying the overall dimensions of the device. Additionally, it would be advantageous if the cradle mechanism itself included safety interlocks, that are undesirably absent from the cradle configurations known in the art. The present invention provides a number of interlocks in an interrupter cradle arrangement that is durable and compact.

SUMMARY OF THE INVENTION

It is an object of the invention to provide a cradle assembly for a circuit interrupter that facilitates removable mounting of the circuit interrupter in an enclosure.

It is another object of the invention to provide a cradle assembly for a circuit interrupter that facilitates movement of the interrupter in either direction between electrically connected and disconnected positions relative to a set of conductor terminals leading to a pair of bus bars.

It is a further object of the invention to provide a system of coordinated interlocks that prevent unsafe operations of the interrupter during installation/removal steps and also prevent unsafe installation/removal steps in view of the interrupter's present status, in a manner whereby the interlocks do not interfere with testing or normal operations.

More particularly, it is an object of the invention to provide a cradle assembly for a circuit interrupter that has a safety interlock precluding disconnection of the circuit interrupter from the bus bar terminals while the circuit interrupter is closed.

It is another object of the invention to provide a cradle assembly for a circuit interrupter that has a safety interlock precluding withdrawal of the support assembly from the enclosure while the circuit interrupter is electrically connected to the bus bar terminals.

It is another object of the invention to provide a cradle assembly for a circuit interrupter that has a safety interlock precluding the circuit interrupter from making electrical connection with the bus bar terminals while the support assembly is being installed in the enclosure.

It is another object of the invention to provide a cradle assembly for a circuit interrupter that prevents the circuit interrupter from closing while the device is being moved between the electrically connected and disconnected positions.

It is another object of the invention to provide a cradle assembly for a circuit interrupter that has a safety interlock that positively trips the circuit interrupter as the support assembly is being withdrawn from the enclosure.

These and other objects are accomplished by a cradle assembly for removably mounting a circuit interrupter to an enclosure. The enclosure has openings in a rear wall through which conductor terminals extend. The conductor terminals lead back to bus bars of a power distribution network or the like. The enclosure also defines a front opening that provides access to the conductor terminals.

The cradle assembly comprises an enclosure-engaging frame and an interrupter-engaging frame releasably attached to the interrupter. The interrupter frame is movably coupled to the enclosure-engaging frame for relative movement between extended and retracted positions.

A left and right sliding bolt are movably supported by the enclosure-engaging frame for moving between in and out positions. A threaded drive shaft is rotatably supported by the enclosure-engaging frame. An interrupter-mounting block is threadably engaged to the drive shaft for driving the interrupter and the interrupter-engaging frame between the extended and retracted positions in response to the reversible rotation of the drive shaft.

The cradle assembly and releasably attached interrupter are sized for removable passage through the front opening while the sliding bolts are slid to the in position. The sliding bolts slide out into cooperating recesses in the sides of the enclosure for releasably retaining the enclosure-engaging frame in the enclosure so as to remain stationary relative to the conductor terminals. In operation, driving the interrupter-engaging frame between the extended and retracted positions respectively moves the interrupter between electrically coupled and uncoupled relationships with the conductor terminals.

The drive shaft has a front end terminating in a bolt for releasably coupling with a drive socket that transmits the drive input. The interrupter-engaging frame rotatably carries support wheels, and the enclosure defines a floor for supporting the wheels as the interrupter-supporting frame is moved reversibly between its extended and retracted positions.

Overall, the cradle assembly is substantially flat but is strong and durable. For example, the cradle assembly adds about 80 mm of increased vertical height to a circuit interrupter weighing around 300 pounds.

The cradle assembly includes a drive interlock that permits operation of the drive shaft when the sliding bolts are slid to the in position and precludes operation of the drive shaft when the sliding bolts are slid to the out position.

The cradle assembly also includes another drive interlock that blocks socket access to the drive shaft nut whenever the interrupter contacts are closed.

The cradle assembly includes a retracted-position interlock that precludes the sliding of the sliding bolts from the out position while the interrupter-engaging frame is positioned in the extended position.

The cradle assembly includes a disabling interlock that disables the circuit interrupter while the interrupter-engaging frame is being driven between the extended and retracted positions.

Additionally, the cradle assembly includes a trip-disabling interlock that operatively trips and disables the circuit interrupter when the enclosure-engaging frame is being withdrawn from the enclosure.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
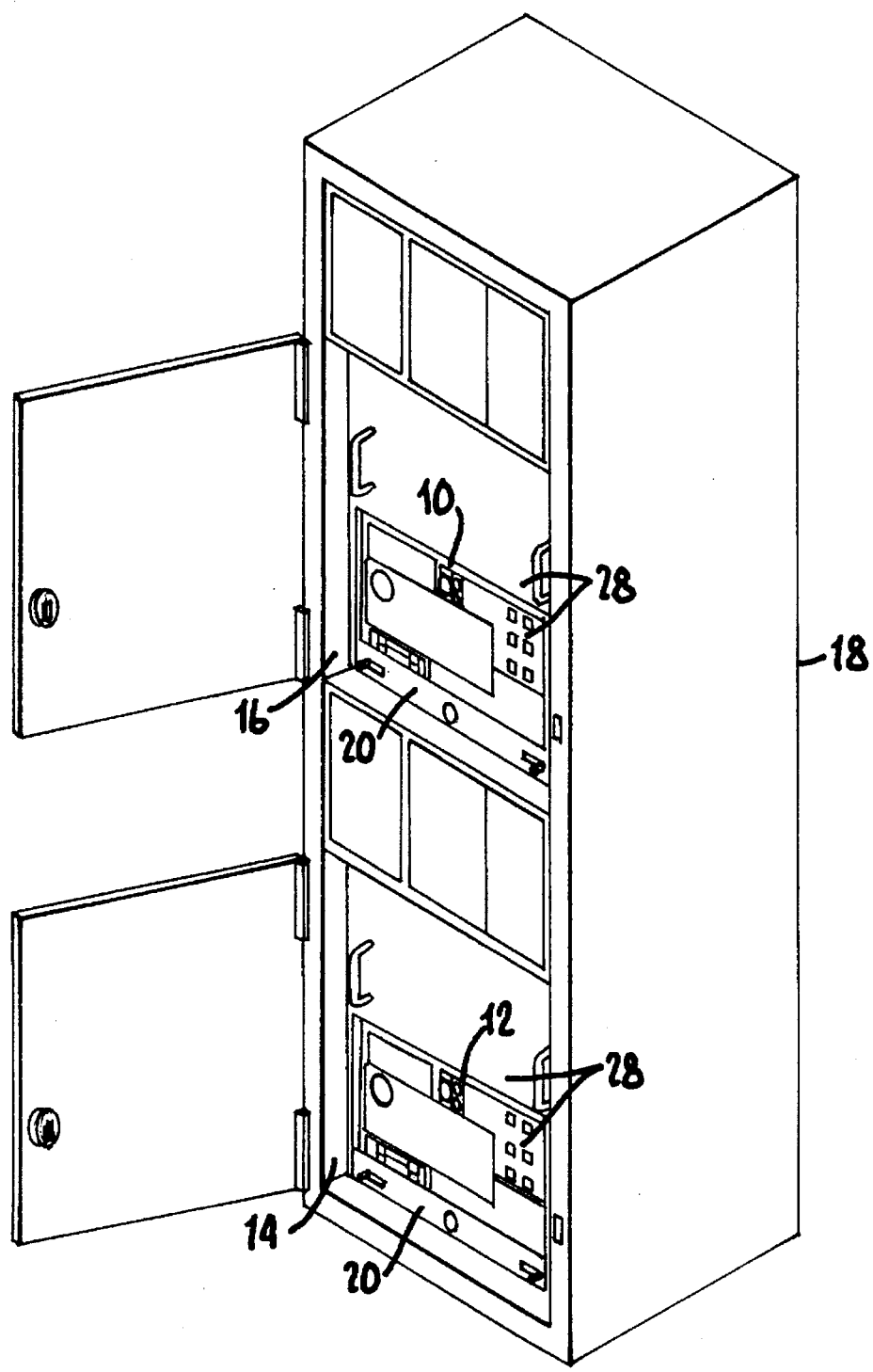
FIG. 1 is a perspective view of two cradle assemblies according to the present invention, shown installed in a double-tier breaker enclosure to illustrate the operative environment therefor.
Figure 2:
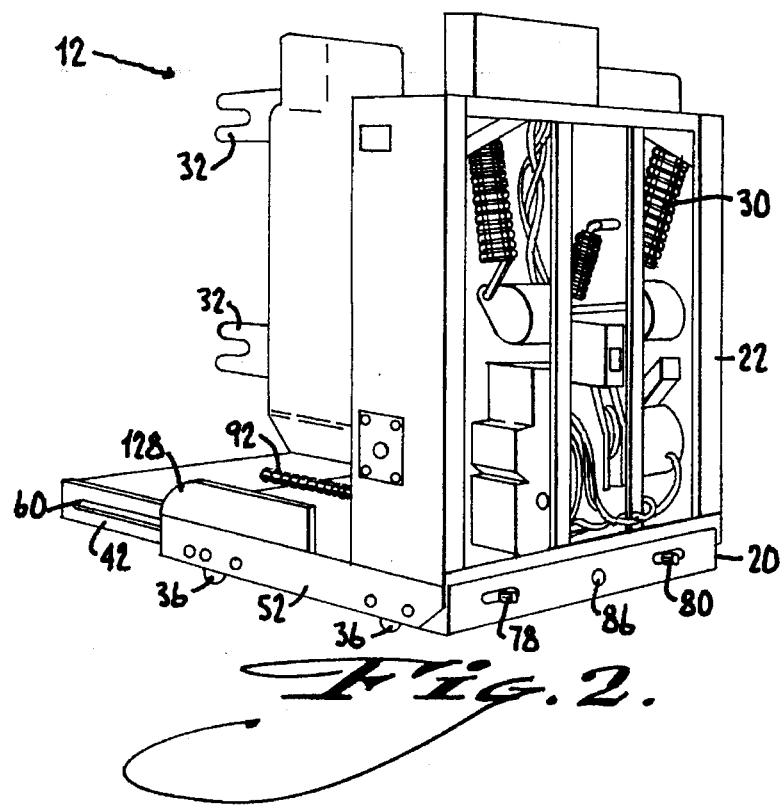
FIG. 2 is an enlarged front perspective view of the cradle and breaker assembly.
Figure 3:
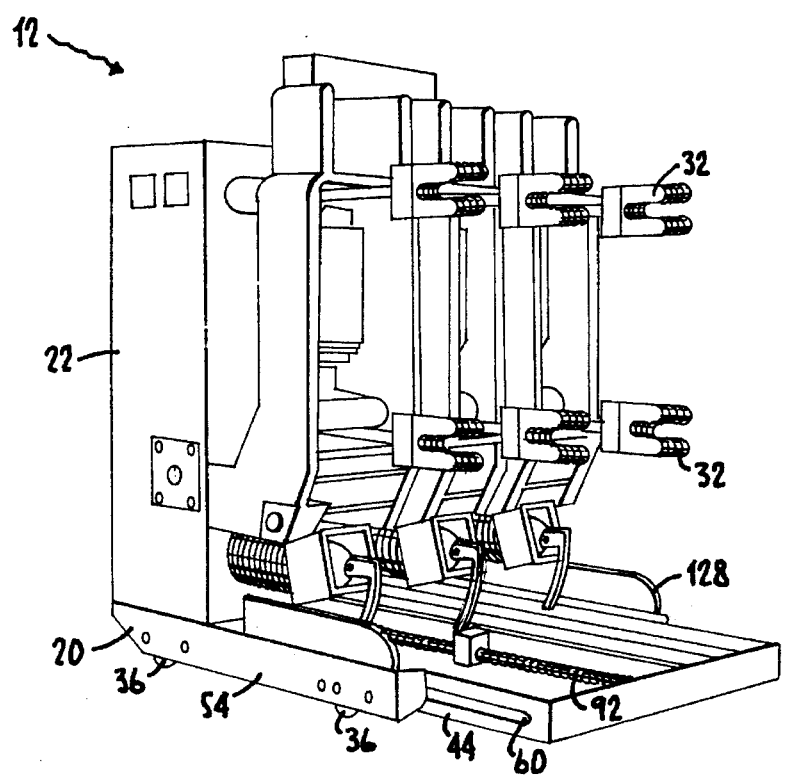
FIG. 3 is a rear perspective view of the cradle and breaker assembly as shown in FIG. 2.

FIG. 1 shows a pair of vertically stacked cradle and breaker assemblies 10 and 12 according to the invention, placed within upper and lower breaker compartments 14 and 16 of a double-tier breaker enclosure 18. FIGS. 2 and 3 show the lower cradle and breaker assembly 12, and are also representative of the upper cradle and breaker assembly 10. The cradle and breaker assembly 12 comprises a breaker 22 and a cradle assembly 20 supporting the breaker 22. While the breakers 22 are generally not shown in FIG. 1 due to front cover plates 28, FIG. 2 shows the breaker 22 as uncovered by the front cover plates 28.

The breaker 22, per se, can be a conventional commercially available breaker. The breaker 22 weighs, for example, around 300 pounds, and includes internal breaker contacts (not shown) that are movable between engaged and disengaged positions by a breaker mechanism (not shown) that typically has closed, open, and tripped positions. A remotely operable motor (not shown) controls the breaker mechanism (not shown) for movement between positions. The motor can supply the mechanical power needed to selectively charge sets of charging springs 30 (FIG. 2) that are used in a known manner for sudden release of energy to provide high-speed quick-to-make and quick-to-break contact action.

FIG. 3 shows the rear of the breaker 22. The breaker 22 has six terminals 32 arranged in upper and lower rows of three columns. FIGS. 2 and 3 show the cradle assembly 20 supporting breaker 22. The cradle assembly 20 includes four wheels 36 for supporting the weight of the cradle and breaker assembly 12 and allowing the unit to be rolled back and forth in the enclosure.

Figure 4:
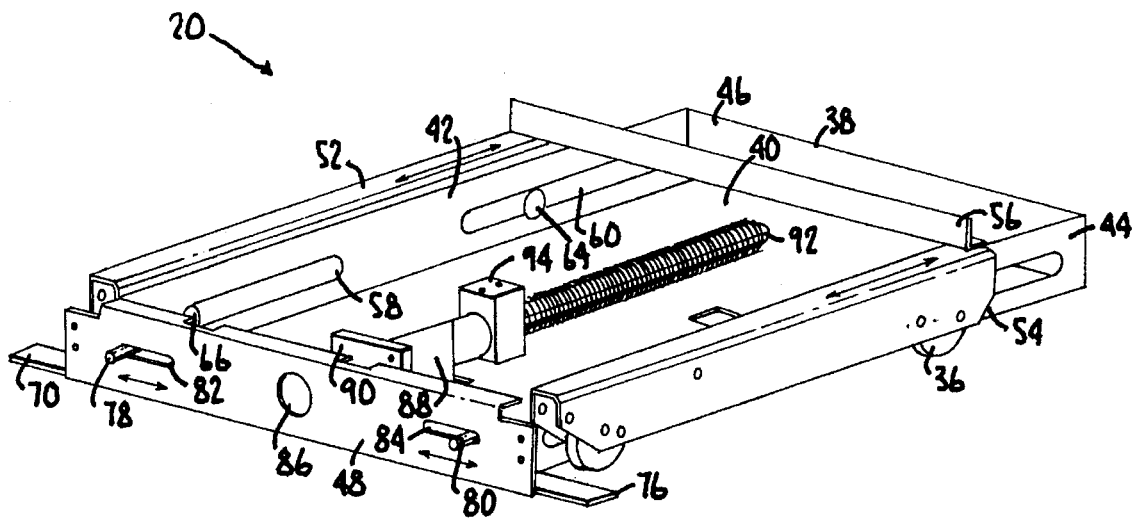
FIG. 4 is an enlarged partial perspective view showing a portion of the cradle assembly according to the invention.
Figure 5:
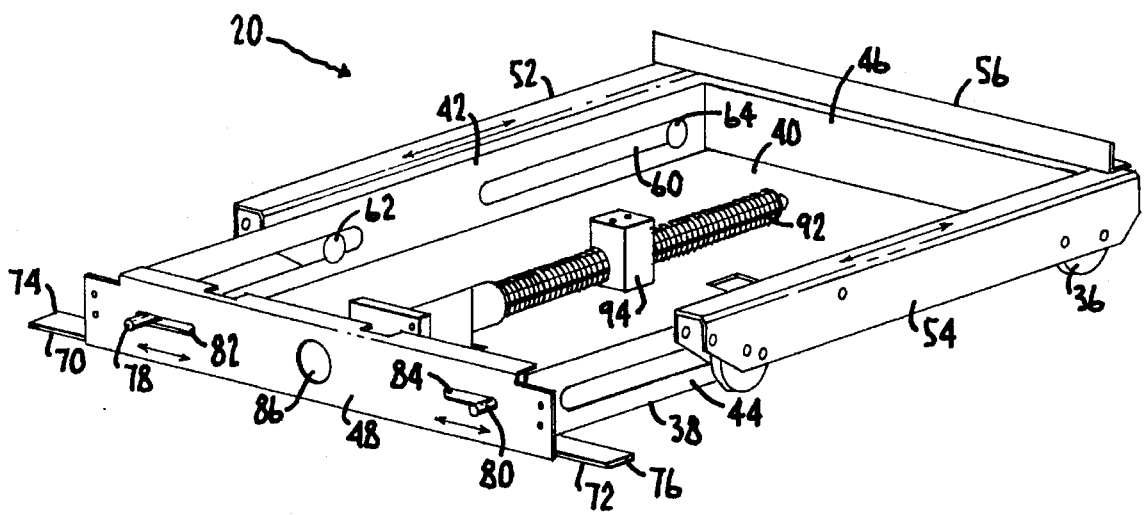
FIG. 5 is a view similar to FIG. 4 except that the cradle assembly is disposed in its alternate position.

FIGS. 4 and 5 show the cradle assembly 20 in a partially disassembled state. The cradle assembly 22 includes a rectangular pan 38 having a rectangular bottom 40 extending between front and back edges spaced by left and right edges. Opposite sidewalls 42 and 44 extend up from the left and right edges of the bottom 40 of the pan 38. A rear wall 46 extends up from the rear edge of the bottom 40 of the pan 38. The sidewalls 44 and 42 have front edges supporting a front panel 48, which extends across the front edge of the bottom 40 of the pan 38.

Flanking the sidewalls 42 and 44 are a pair of opposite rails 52 and 54. The rails 52 and 54 have an inverted-U shape, and extend between front and back ends. Each rail 52 and 54 rotatably supports a pair of the previously-mentioned wheels 36 in a front-to-back spaced relationship. The opposite rails 52 and 54 are rigidly spaced apart by an angle cross bar 56 which extends between opposite connections to the back ends of the rails 52 and 54. The vertical distance between the bottom of the ground-engaging wheels 36 and the top of the rails 52 and 54 is about 80 mm.

Each sidewall 42 and 44 is recessed through with forward and rearward slots 58 and 60. The forward and rearward slots 58 and 60 of each sidewall 42 and 44 are elongated and extend in the front to rear direction along a common axis. Each rail 52 and 54 correspondingly supports a forward and rearward guide pin 62 and 64. The forward and rearward guide pins 62 and 64 of each rail 52 and 54 extend inwardly through the adjacent forward and rearward slots 58 and 60. The guide pins 62 and 64 are slidably movable in the slots 58 and 60. As a result, the interengaged rails and crossbar 52, 54 and 56 are slidably movable as a unit reversibly in the front and back directions relative to the pan 38.

The front panel 48 slidably supports left and right shoot bolts 70 and 72. The shoot bolts 70 and 72 have laterally outer ends 74 and 76 respectively. The laterally outer ends 74 and 76 extend further laterally out than either the rails 52 and 54 or the left and right edges of the front panel 48. The shoot bolts 70 and 72 are driven by the sliding handles 78 and 80 which protrude through elongated slots 82 and 84 in the front panel 48. The shoot bolts 70 and 72 are slidable back and forth between an in position (not shown) and an out position (FIGS. 4 and 5). The front panel 48 also has a central aperture 86 along the axis of drive shaft 92, for access.

The bottom 40 of the pan 38 supports a bracket 88 supporting a bearing collar 90. The bearing collar 90 (and associated bearing) rotatably supports a drive shaft 92. A breaker-mounting block 94 is threadably interengaged with the drive shaft 92 for linear travel reversibly in the front to back direction.

Figure 6:
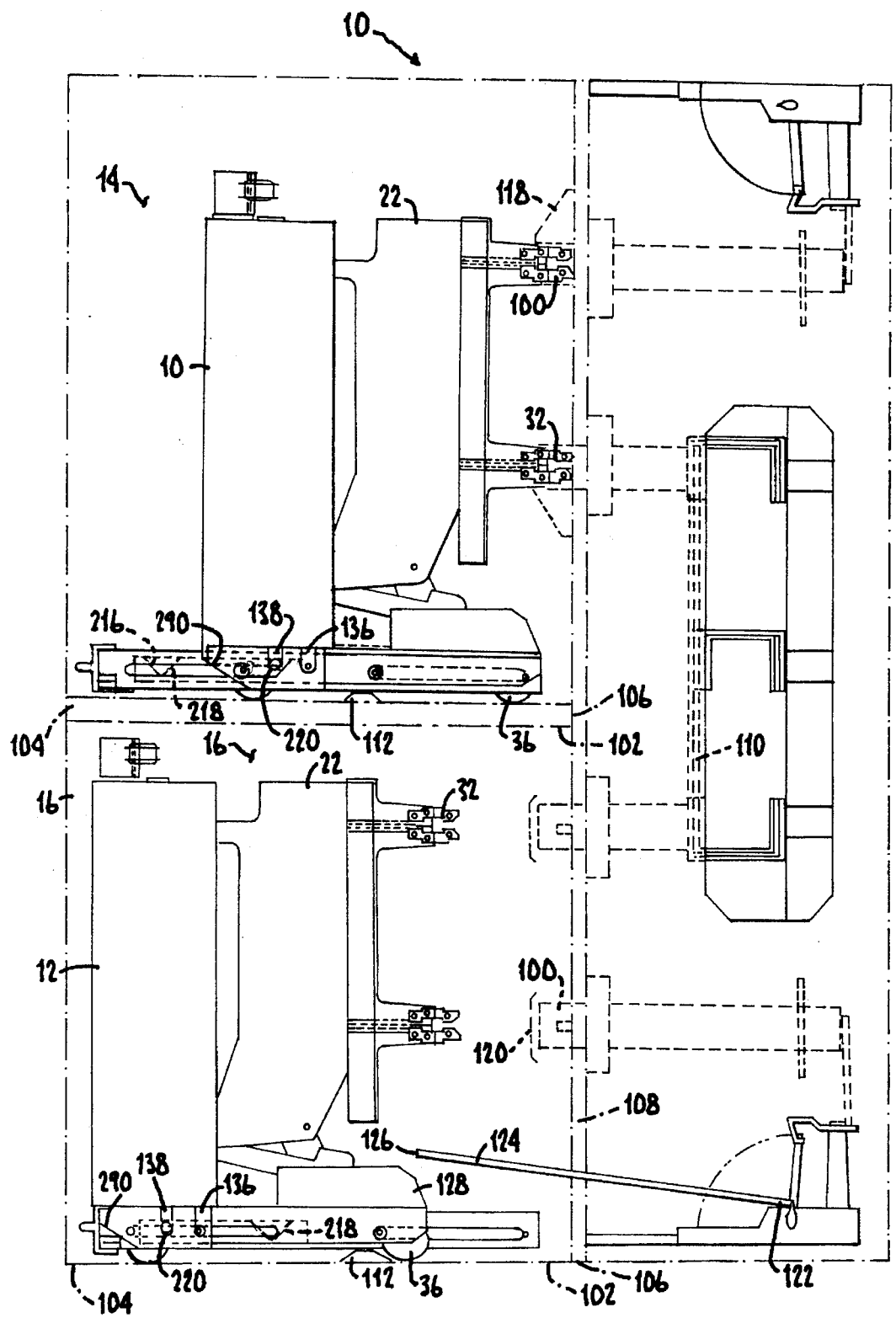
FIG. 6 is a side elevation view of FIG. 1 with the double-tier breaker enclosure shown in broken lines.

FIG. 6 shows the double-tier breaker enclosure 18 supporting an upper and lower set of stationary terminals 100, also called stabs. The stabs 100 are accessible through the upper and lower compartments 14 and 16 respectively. Each breaker compartment 14 and 16 defines a generally horizontal floor 102 for supporting the wheels 36 of the cradle and breaker assemblies 10 and 12. The floor 102 extends horizontally between front and back edges 104 and 106. The floor defines a ridge 112 that is laterally positioned between the left and right pathways of the left and right ground-engaging wheels 36. The back edges 106 abut a common rear wall 108. The stabs 100 extend forwardly through the rear wall 108 as shown, and rearwardly behind the rear wall 108 to bus bars 110. The bus bars 110 extend away, for example, to electrical interconnections with a primary power-supplying or source, an auxiliary power-supplying source, and a power-consuming load, each of which is typically coupled to the apparatus by power transmission lines.

Upper and lower sets of shutters 118 and 120 are associated with the stabs 100 of the upper and lower compartments 14 and 16 respectively. The lower set of shutters 120, which also are representative of the upper set of shutters 118, are operated by a shutter drive system 122. The shutter drive system 122 includes an elongated lever arm 124 that is pivotable about a pivot axis through its back end. The elongated lever arm 124 extends from its pivoted back end forwardly through a slot (not shown) in the rear wall 108 to a free front end 126.

The cradle assembly 20 supports left and right drive cams 128 (the right one being shown in FIG. 6). The drive cams 128 are fixed to the left and right rails 52 and 54. The rear edge of the drive cams 128 align generally vertically with the rear ends of the rails 52 and 54.

Each breaker 22 has three reciprocating interlocks extending down from the bottom. More particularly, each breaker 22 has a reciprocating post 136 and reciprocating left and right roller-supporting interlocks 138 (the right one being shown in FIG. 6). The interlocks 136 and 138 of each breaker 22 are shown in an extended position. In the fully extended position, the interlocks 136 and 138 extend down to final positions spaced just above the bottom 40 of the pan 38. The interlocks 136 and 138 move upwardly when moved toward their retracted positions.

Figure 7:
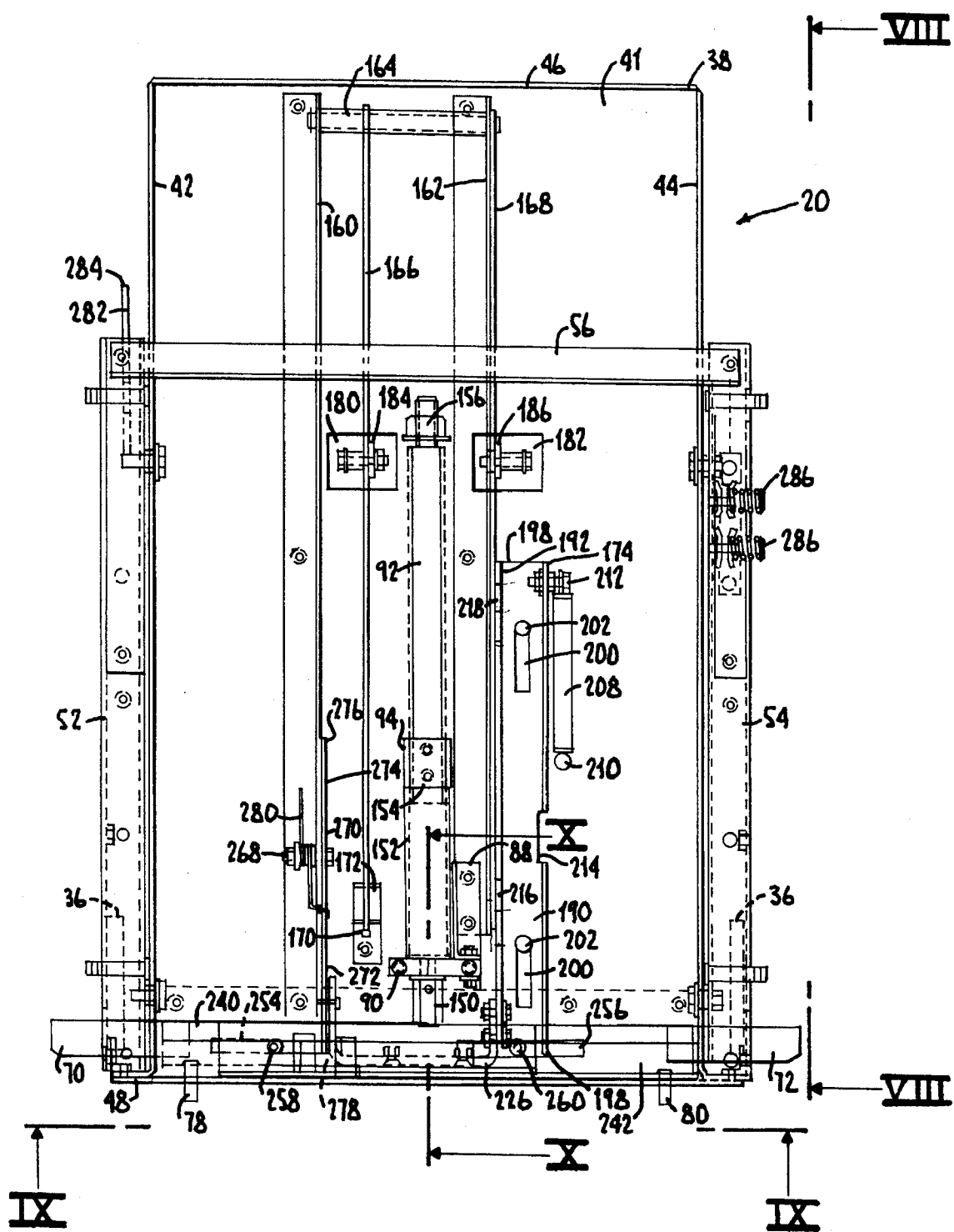
FIG. 7 is a top plan view of a cradle assembly according to the invention.

As shown in FIG. 7, the drive shaft 92 has a front end terminating in a socket-engaging nut 150. The socket-engaging nut 150 is positioned just behind the front panel 48. The socket-engaging nut 150 and drive shaft 92 are rotatably supported by bearings (not shown) mounted in the collar 90. A travel limit sleeve 152 is placed coaxially around the drive shaft 92. The sleeve 152 is positioned axially along the drive shaft 92 until the sleeve 152 abuts against the collar 90. The sleeve 152 has a rearward end 154 providing an abutment surface for engaging the breaker-mounting block 94. A travel-limiting nut 156 is fixed to the rearward end of the drive shaft 92. The travel-limiting nut 156 provides a forward-facing abutment surface likewise for engaging the breaker-mounting block 94.

The bottom 40 of the breaker pan 38 supports a pair of upstanding ribs 160 and 162 that extend generally the length of the cradle pan 38 in the front to back direction. A pivot pin 164 is supported between the two ribs 160 and 162 near the rearward end of the cradle pan 38. The pivot pin 164 pivotally supports the rear ends of first and second lever arms 166 and 168. The two levers arms 166 and 168 generally extend from their pivoted rear ends to forward ends, normally lying across the top surface of the bottom 40 of the pan 38.

The first lever arm 166 has a forward portion slidably guided by a vertical slot 170 in a guide 172 that is mounted to the bottom 40 of the pan 38. The second lever arm 168 is sandwiched between the right rib 162 and an elongated channel 174 as guide means. Each lever arm 166 and 168 extends across a rectangular opening 180 and 182 in the bottom 40 of the pan 38, and supports a roller or follower 184 and 186 at the locations of the rectangular openings 180 and 182.

The elongated channel 174 comprises a web portion 190 extending laterally between left and right upstanding flanges 192 and 194. The web and flanges 190, 194 and 192 extend in the front to back direction between forward and rearward ends 196 and 198. The web portion 190 has a pair of elongated slots 200 which extend in the front to back direction on a common axis. The bottom 40 of the pan 38 supports a pair of upstanding guide pins 202 which extend up through the elongated slots 200 of the web 190. The elongated channel 174 is slidable reversibly in the front to back direction between fully forward (FIGS. 4 AND 5) and fully rearward (not shown) positions as constrained by the sliding engagement between the guide pins 202 and elongated slots 200.

A coil tension spring 208 is positioned adjacent to the right of the right flange 194 of the elongated channel 174. The spring 208 has a forward end 210 retained by a pin engaged to the bottom of the pan 38 and a rearward end 212 retained by a bolt engaged to the right flange 194 of the elongated channel 174. In the absence of an overpowering force (as discussed below), the spring 208 normally retains the elongated channel 174 in the fully forward position (e.g., FIGS. 4 and 5).

The fight flange 194 of the elongated channel 174 is partitioned by a central rectangular gap 214. The left flange 192 of the elongated channel 174 is recessed through with forward and rearward V-shaped notches 216 and 218.

The front end 196 of the elongated channel 174 supports a laterally extending bracket 226 at the right end of the bracket 226. The bracket 226 is movable reversibly in the front to back direction as it is fixed to the sliding channel 174. The bracket 226 has a central aperture 232 (see FIG. 10) defining a central axis that is common with the rotation axis of the drive shaft 92. The central aperture 232 is sized for permitting the socket-engaging nut 150 to pass removably through.

Figure 10:
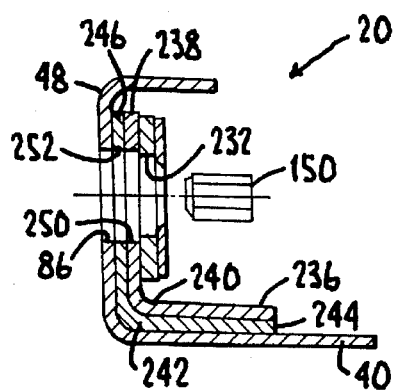
FIG. 10 is an enlarged section view taken along line 10—10 in FIG. 7.

Each shoot bolt 70 and 72 is attached at its inward end to a sliding angle piece 240 and 242 respectively. FIG. 10 shows that the angle pieces 240 and 242 have horizontal bottom flanges 236 and 244 and upstanding forward flanges 238 and 246, respectively. The upstanding forward flange 238 and 246 of the angle pieces 240 and 242 securely support the sliding handles 78 and 80 in positions projecting through the elongated slots 82 and 84 in the front panel 48.

The front panel 48 is disposed in front of the upstanding flange 246 of the angle piece 242 of the right shoot bolt 70, which is disposed in front of the upstanding flange 238 of the angle piece 240 of the left shoot bolt 70, which in turn is disposed in front of the bracket 226 (FIG. 10). The from panel 48 is stationary relative to the cradle pan 38. The angle pieces 240 and 242 of the shoot bolts 70 and 72 are slidable reversibly in the left to right directions between an in position (not shown) and an out position (FIGS. 4, 5, 7 and 9). The bracket 226 is slidable reversibly in the front to back direction with the sliding channel 174.

The upstanding flanges 238 and 246 of the angle pieces 240 and 242 have apertures 250 and 252 respectively. The apertures 250 and 252 define central axes that are alignable on a common axis (FIG. 10) only while the shoot bolts 70 and 72 are slidably extended to the out position (as shown in FIGS. 4, 5, 7, and 9). The common axis of the apertures 250 and 252 is also common with the rotation axis of the drive shaft 92, the axis of the central aperture 86 of the front panel 48, and the axis of the central aperture 232 in the bracket 226.

The bottom flanges 236 and 244 of the angle pieces 240 and 242 have elongated slots 254 and 256 that extend along a common axis extending in the left to right direction. The bottom 40 of the pan 38 supports a pair of upstanding guide pins 258 and 260 that extend up through the elongated slots 254 and 256. The upstanding guide pins 258 and 260 cooperate with the elongated slots 254 and 256 to constrain the sliding movement of the left and right shoot bolts 70 and 72, between the in position and the out position.

The left rib 160 supports a pivot pin 268 to which a lever 270 is pivoted. The pivot pin 268 defines a pivot axis extending in the left to right direction. The lever 270 is pivotable in the clockwise and counterclockwise directions (as viewed in FIG. 8). The lever 270 has a forward arm 272 and rearward arm 274 which are respectively forward and rearward of the engagement with the pivot pin 268. The rear arm 274 defines a cam 276 that faces upwardly. The front arm 272 defines a stop surface 278 for abutting against the bottom 40 of the cradle pan 38. A clip spring 280 is interconnected among the rib 160, pivot pin 268, and rearward arm 274 for resiliently urging the stop surface 278 of the front arm 272 in abutment against the bottom 40 of the pan 38.

The left rail 52 supports a plate 282 that extends rearwardly past the rearward end of the left rail 52. The plate 282 has a rearward facing end 284 defining an abutment surface.

The right rail 54 supports a pair of grounding contacts 286. The grounding contacts 286 have contact surfaces 288 that are biased by springs into abutting engagement with the exterior of the right sidewall 44 of the cradle pan 38. The grounding contacts 286 electrically interconnect the rails and crossbar 42, 44 and 56 with the pan 38 (and associated components) so that all generally assume the same electric potential.

The use and function of the apparatus include the following. The cradle assembly 20 movably supports the 300 pound breaker 22 for installation in either breaker compartment 14 or 16 of the breaker enclosure 18. The cradle and breaker assemblies 10 and 12 are assembled before installation in the compartments 14 and 16 of the enclosure 18.

The breaker 22 can be mounted on the cradle assembly 20 by use of a lifting crane or the like. The bottom of the breaker 22 is placed on top of the rails 52 and 54, and the breaker 22 is releasably fastened in place by three fasteners to each rail 52 and 54. In addition, the breaker 22 is releasably fastened to the breaker-mounting block 94. The cradle assembly 20 represents only about 80 mm of the total height the cradle and breaker assembly 12.

The breaker 22 moves in unison with the breaker-mounting block 94 and rails 52 and 54. The breaker 22, the breaker-mounting block 94 and rails 52 and 54 are movable between a fully extended and fully retracted position relative to the cradle pan 38. FIGS. 4 and 7 show the rails and breaker-mounting block 52, 54 and 94 in a generally retracted position relative to the cradle pan 38. FIG. 5 shows the rails and breaker-mounting block 52, 54 and 94 in a generally extended position relative to the cradle pan 38.

FIGS. 5 and 6 show the upper cradle and breaker assembly 10, and movement of the breaker 22 to the fully extended position. FIGS. 4 and 7 show the lower cradle and breaker assembly 12, and movement of the breaker to the fully retracted position.

During installation of the lower cradle and breaker assembly 12 (which is also representative of the upper cradle and breaker assembly 10), a lifting crane (not shown) or the like is typically employed to support the cradle and breaker assembly 10. The breaker 22 is driven preliminarily to the retracted position (e.g., FIGS. 4 and 7). When the breaker 22 is placed in the retracted position, the shoot bolts 70 and 72 are slidably operable between the in position (not shown) and the out position (FIGS. 4, 5, 7 and 9). With the shoot bolts 70 and 72 moved to the in position, the cradle and breaker assembly 12 is ready for installation to proceed.

The cradle and breaker assembly 12 is generally supported in suspension in front of the enclosure 18 until the bottoms of wheels 36 are aligned to the floor 102 of the compartment 14. The cradle and breaker assembly 12 is then passed across the front edge 106 of the compartment until the wheels 36 make contact the floor 102 to support the apparatus. The cradle and breaker assembly 12 is moved further forwardly until the shoot bolts 70 and 72 align opposite to corresponding recesses (not shown) in the side walls of the enclosure 18. At that position, the shoot bolts 70 and 72 are slid to the out position for retaining the cradle pan 38 in a stationary relationship with the stabs 100 and enclosure 18.

The breaker 22 can only be driven while the shoot bolts 70 and 72 are extended to the out position and the breaker mechanism is set to the open position. If the shoot bolts 70 and 72 are extended out and the breaker mechanism is set open, a drive socket (not shown) can be inserted removably through the three socket access apertures 86, 250 and 252

(FIG. 10). The corresponding drive socket (not shown) has a greater outside diameter than the diameter of the nut access aperture 232 of the sliding bracket 226. Rather than extending through the nut access aperture 232, the drive socket abuts against the sliding bracket 226. Further forward extension of the drive socket slides the sliding bracket 56 rearwardly relative to the socket-engaging nut 160. Continuing further forward causes the socket-engaging nut 150 to extend removably through the nut access aperture 232 of the sliding bracket 226. As the socket-engaging nut 150 extends through the nut access aperture 232, the drive socket can operatively engage the socket-engaging nut 150 for driving the nut 150 reversibly in the clockwise or counterclockwise directions.

When the breaker 22 is in the fully retracted position (see FIG. 6, lower assembly), the breaker-mounting block 94 abuts the rearward end 154 of the sleeve 152. Rotating the nut 150 in one direction drives the breaker-mounting block 94 forward. The breaker-mounting block 94 can be driven forward until it abuts against the travel limiting nut 156. The abutment surface 284 is simultaneously driven into abutment with the rear wall 108. As a result, the breaker 22 is placed in the fully extended position (see FIG. 6, upper assembly). When driven from the retracted to the extended position, the terminals 32 of the breaker 22 engage the stabs 100.

The pivoting lever 270 (see FIG. 7) changes position as the breaker 22 is driven reversibly between the extended and retracted positions. While the breaker 22 is in the fully retracted position, a portion 290 (FIG. 6) of the bottom of the breaker engages the cam 276 of the upper rearward arm 274. The engagement between the cam 276 and the bottom 290 of the breaker 22 causes the lever 270 to be pivoted clockwise relative to the orientation shown by FIG. 8, to a horizontal orientation. The clip spring 280 resiliently urges the cam 276 in abutting engagement with the bottom 290 of the breaker 22.

The portion 290 of the bottom of the breaker 22 that the cam 276 engages inclines upwardly in the direction extending from back to front. As the breaker 22 is driven forwardly from the retracted position (see cradle and breaker assembly 12 in FIG. 6) to the extended position (cradle and breaker assembly 10 in FIG. 6), the cam 276 follows the upwardly-retreating contour of the bottom 290 of the breaker 22. The upper-rearward arm 274 consequently pivots relatively upward and counterclockwise to a final position generally shown in FIG. 8.

At the same time the lower-forward arm 272 pivots downwardly into notches (not shown) in the bottom flanges 236 and 244 of the sliding angles 240 and 242 of the shoot bolts 70 and 72. The lower-forward arm 274 thus interferes with the sliding action of the shoot bolts 70 and 72. As a result, the shoot bolts 70 and 72 are retained from sliding away from the out position after the breaker 22 is driven forwardly away from the retracted position (e.g., cradle and breaker assembly 12 in FIG. 6).

The above procedure occurs in reverse in withdrawing the cradle and breaker assembly 12 from the compartment 16. Briefly, the breaker 22 must be driven to the retracted position so that the lower-forward arm 374 will be pivoted out of the notches (not shown) in the bottom flanges 236 and 244. As a result, the lower-forward arm 272 will no longer interfere with the sliding action of shoot bolts 70 and 72.

Accordingly, the pivoting lever 270 cooperates with the bottom of the breaker 22 and notches (not shown) in the bottom flanges 236 and 244 to provide a breaker position interlock that disables the operability of the shoot bolts 70 and 72 whenever the breaker 22 is moved away from the retracted position.

The sliding bracket 226 blocks access to the socket-engaging nut 150 until (a) the shoot bolts 70 and 72 are extended to the out position and (b) the breaker mechanism is set to the open position.

With reference to FIG. 10, the left and right shoot bolts 70 and 72 (not shown in FIG. 10) are rigidly associated the respective socket access apertures 250 and 252. The socket access apertures 250 and 252 are alignable for permitting removable access of a drive socket that can be inserted through the socket access aperture 86 of the front panel 48. The axes of the socket access apertures 250 and 252 align only while the shoot bolts 70 and 72 are extended into their out position.

However, a drive socket cannot operatively engage the nut 150 unless the sliding bracket 236 can be moved from the normally fully forward position (FIG. 7) to the fully rearward position. Access to the socket-engaging nut 150 is gained by moving the sliding bracket 226 rearwardly so that the nut 150 can removably extend through the nut access aperture 232.

FIG. 6 shows the breakers 22 having the posts 136 extending from the bottoms thereof. The posts 136 are shown in an extended down position for both the upper and lower cradle and breaker assemblies 10 and 12. It is an aspect of the breakers 22 that the posts 136 only retract up when the breaker mechanisms are moved to the open position. For the lower cradle and breaker assembly 12, the post 136 is illustrated fully extended down and disposed within the rectangular gap 214 of the right flange 194 of the elongated channel 174.

The sliding bracket 226 and elongated channel 174 slide together reversibly back and forth. The post 136, while fully extended down and disposed within the gap 214, interferes with the sliding action of the elongated channel 174. As a result, access to the socket-engaging nut 150 is blocked because the sliding bracket 226 cannot be slid rearwardly, as needed for the socket-engaging nut 150 to extend through the nut access aperture 232. Moving the breaker mechanism to the open position retracts the post 136 fully up, thereby permitting the elongated channel 174 and sliding bracket 226 to slide reversibly back and forth. As the bracket 226 slides rearwardly, the relatively stationary nut 150 protrudes through the nut access aperture 232.

The post 136 lies in the vertical plane defined by the right upstanding flange 194 of the elongated channel 174. The right flange 194 has an upper edge that obstructs the post 136 from extending down whenever the upper edge is positioned beneath the post 136. When the breaker 22 is being driven from the fully retracted position (as shown by the lower assembly 12 in FIG. 6) to the fully extended position (upper assembly 10 in FIG. 6), the upper edge of the right channel 194 generally obstructs the post 136 from extending down.

However, after the breaker 22 is finally positioned in the fully extended position, the post 136 clears the rearward end 198 of the elongated channel, and can once again extend fully down as shown. While the post 136 is extended fully down behind the end 198 of the right flange 194, the sliding bracket 226 is inoperable again. Any attempt to gain access to the socket-engaging nut 150 with a drive socket is denied because the post 136 obstructs the elongated channel 174 from sliding rearwardly.

Accordingly, the right flange 194 and sliding bracket 226 cooperate with a drive socket and reciprocating post 136 to provide a drive interlock for blocking access to the drive shaft nut 150 whenever the breaker mechanism is in any position other than the open position.

The left flange 192 of the elongated channel 174 defines a vertical plane containing the right roller-supporting interlock 138. It is a feature of the breaker 22 that the interlock 138 trips and disables the breaker mechanism. This tripping-disabling interlock 138 extends downward from the bottom of the breaker 22 and terminates in a roller or follower 220 disposed for rolling along (or following) the upper edge of the left flange 192. The tripping-disabling interlock 138 extends to a relatively downward position whenever the roller or follower 220 rolls into one of the V-shaped notches 216 and 218 (FIG. 6). Otherwise, while rolling along the horizontal segment of the upper edge between the V-shaped notches 216 and 218, the roller or follower 220 moves the tripping-disabling interlock 138 to a relatively upward position. The upward retraction of the tripping-disabling interlock 138 trips and disables the breaker mechanism, thereby rendering the breaker contacts inoperable under control of the driving motor (not shown). The breaker mechanism is made operable again once the roller or follower 220 rolls into one of the V-shaped notches 216 and 218. The roller of the tripping-disabling interlock 138 aligns with the V-shaped notches 216 and 218 if the breaker 22 is respectively positioned in the fully extended or retracted positions, as shown by FIG. 6.

Accordingly, the left flange 192 of the elongated channel 174 cooperates with the trip-disabling interlock 138 to trip and disable the breaker mechanism whenever the breaker 22 is moved away from either the fully extended or retracted positions.

The drive cam 128 of the cradle assembly 20 actuates the shutter drive system 122 to operate the shutter interlocks 118 and 120. As the breaker and rails 22, 52 and 54 are driven from the retracted position to the extended position, the drive cam 128 engages the lever arm 124 of the shutter drive system 122. As the drive cam 128 continues forwardly, the lever arm 124 follows the upwardly-climbing contour of the drive cam 128 and thus pivots upwardly (clockwise as viewed in FIG. 6). The upward pivoting of the lever arm 124 causes a change of position in the shutter interlocks from a closed position (see shutter interlocks 120) to an open position (see shutter interlocks 118).

Figure 8:
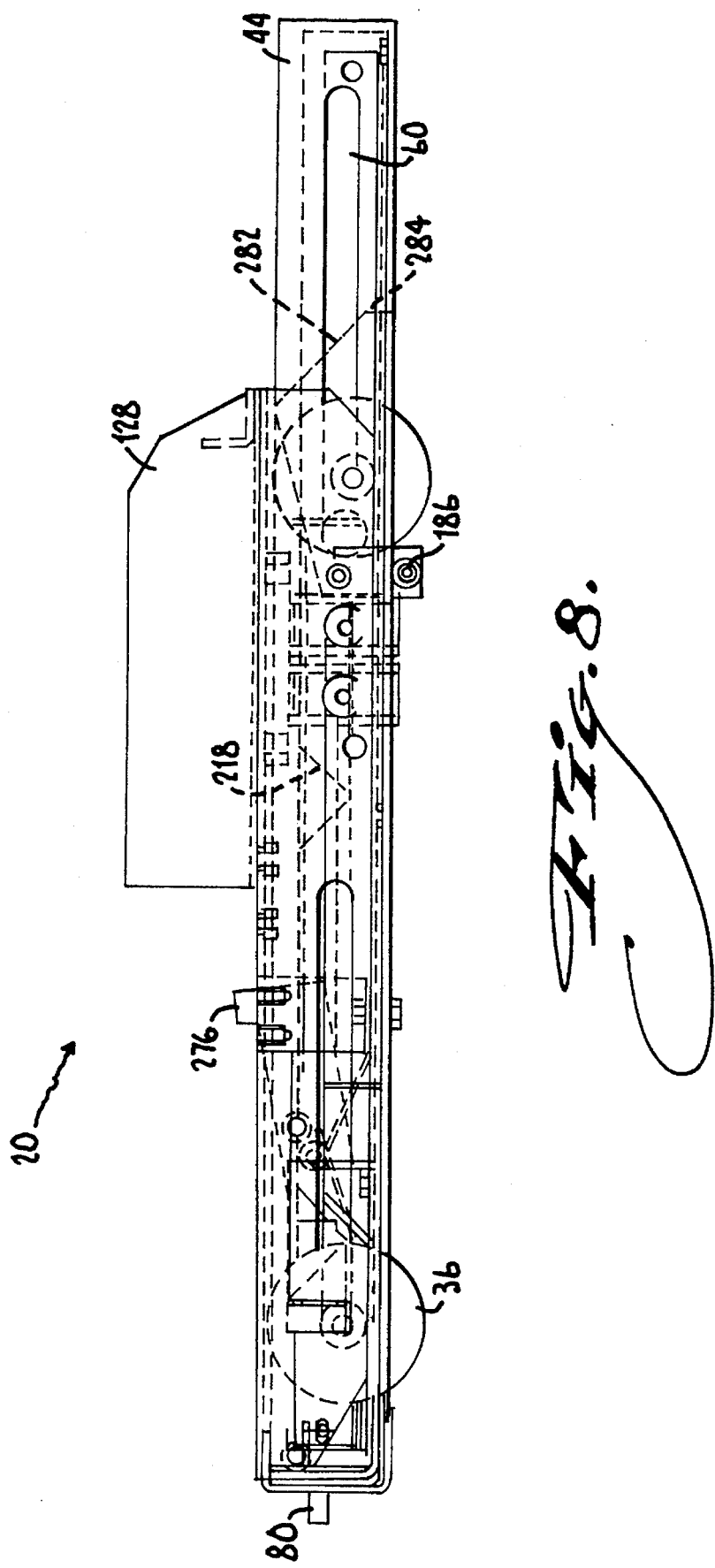
FIG. 8 is a view taken in the direction of arrows 8—8 of FIG. 7.
Figure 9:
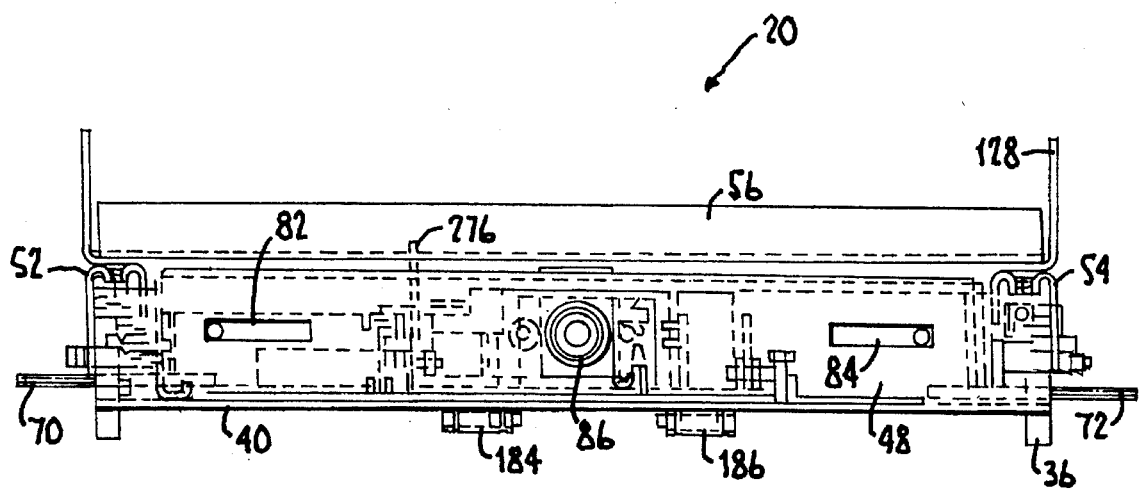
FIG. 9 is a view taken in the direction of arrows 9—9 of FIG. 7.

The rollers or followers 184 and 186 cooperate with the ridges 112 on the compartment floors 102 of the compartments 14 and 16 to pivot the lever arms 166 and 168 upward (clockwise in FIG. 8). Withdrawal of the cradle and breaker assembly 12 (as represented by cradle and breaker assembly 10) results in the rollers or followers 184 and 186 following the ridge 112 as the rollers or followers 184 and 186 cross the ridge 112. The right lever arm 168 actuates the trip-disabling interlock 138 of the breaker 22. The left lever arm 166 actuates a similar roller-supporting interlock (out of view behind interlocks 138 in FIG. 6), which when actuated discharges the charging springs 30 of the breaker 22.

Accordingly, the cooperation between the roller or follower 184 and ridge 112 provide a discharging interlock for discharging the springs 30 of breaker 22 whenever the cradle and breaker assembly 12 is being withdrawn. Springs 30 are preferably substantial, as needed to promptly operate the 300 pound breaker.

Likewise, the roller or follower 186 cooperates with the ridge 112 to provide a breaker mechanism trip-disabling interlock whenever the cradle and breaker assembly 12 is being withdrawn.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A support assembly the removably mounting a circuit interrupter in an enclosure, the enclosure defining conductor-terminal openings through which conductor terminals extend and a front opening providing access to the conductor terminals, the support assembly comprising:

an enclosure-engaging frame;

an interrupter-engaging frame that is releasably attached to the interrupter and is movably coupled to the enclosure-engaging frame for relative movement between extended and retracted positions;

retaining means supported by the enclosure-engaging frame for moving between an in position and an out position;

drivable means associated with the enclosure-engaging frame for driving the interrupter-engaging frame and interrupter between the extended and retracted positions in response to drive power supplied by a drive input;

the support assembly and interrupter being sized for removable passage through the front opening while the retaining means is positioned in the in position, wherein the retaining means cooperates with the enclosure while positioned in the out position for releasably retaining the enclosure-engaging frame stationary relative to the conductor terminals such that driving the interrupter-engaging frame between the extended and retracted positions respectively positively moves the interrupter between electrically coupled and uncoupled relationships with the conductor terminals; and drive-interlock means the permitting operation of the drivable means when the retaining means is positioned in the out position and for precluding operation of the drivable means when the retaining means is positioned in the in position; said enclosure-engaging frame supporting a front flange having a stationary aperture, and the drive-interlock means comprises an obstructing flange arranged generally parallel to the front flange, the enclosure-engaging frame supporting the obstructing flange for sliding reversibly between left and right positions, the obstructing flange interacting with the retaining means such that changes in the position of the obstructing flange correspond to changes in the position of the retaining means; said obstructing flange having an access aperture that defines a central axis alignable with the stationary aperture when the retaining means is positioned in the out position; said stationary and access apertures being sized for permitting removable passage of a coupling that transmits drive power from the drive input to the drivable means, when said stationary and access apertures are aligned.

2. A support assembly for removably mounting a circuit interrupter in an enclosure, the enclosure defining conductor-terminal openings through which conductor terminals extend and a front opening providing access to the conductor terminals, the support assembly comprising:

an enclosure-engaging frame;

an interrupter-engaging frame that is releasably attached to the interrupter and is movably coupled to the enclosure-engaging frame for relative movement between extended and retracted positions;

retaining means supported by the enclosure-engaging frame for moving between an in position and an out position;

drivable means associated with the enclosure-engaging frame for driving the interrupter-engaging frame and interrupter between the extended and retracted positions in response to drive power supplied by a drive input;

the support assembly and interrupter being sized for removable passage through the front opening while the retaining means is positioned in the in position, wherein the retaining means cooperates with the enclosure while positioned in the out position the releasably retaining the enclosure-engaging frame stationary relative to the conductor terminals such that driving the interrupter-engaging frame between the extended and retracted positions respectively positively moves the interrupter between electrically coupled and uncoupled relationships with the conductor terminals; and drive-interlock means the cooperating with said circuit interrupter, wherein said interrupter is of the type having contacts movable between open and closed positions and a lever moving in unison with the contacts movable between contact-open and contact-closed position, said drive-interlock means being associated with the drivable means the permitting operation of the drivable means when the interrupter contacts are open and for precluding operation of the drivable means when the interrupter contacts are closed, said enclosure frame supporting a front flange having a stationary aperture and the drive-interlock means comprising an obstructing flange slidably supported by the enclosure-engaging frame generally to the front flange for sliding reversibly in the front to back direction between/rearward and rearward positions, said drivable means comprising a rotating shaft rotatably supported by the enclosure-engaging frame to extend in the front to back direction, the shaft having a front end terminating in a nut and defining a rotation axis that extends through the stationary aperture, said obstructing flange including a nut-access aperture through which the rotation axis extends, the forward position of the obstructing flange being rearward of the front flange and forward of the nut, the rearward position of the obstructing flange extending rearwardly past the nut such that the nut protrudes partially through the nut-access aperture; and biasing means for biasing the obstructing flange normally in the forward position, said lever and obstructing flange mutually interfering with one another such that the lever must be positioned in the contact-open position to permit the sliding of the obstructing flange from the forward to the rearward position, and the obstructing flange must be in the forward position to permit movement of the lever from the contact-open to the contact-closed position, said stationary aperture being sized for removably receiving a drive socket, the nut access aperture being sized to deny passage to the drive socket such that extension of the drive socket forwardly through the stationary aperture results in the socket abutting the obstructing flange and pushing the obstructing flange rearwardly if permitted by the lever.

3. A support assembly for removably mounting a circuit interrupter in an enclosure, the enclosure defining conductor-terminal openings through which conductor terminals extend and a front opening providing access to the conductor terminals, the support assembly comprising:

an enclosure-engaging frame;

an interrupter-engaging frame that is releasably attached to the interrupter and is movably coupled to the enclosure-engaging frame the relative movement between extended and retracted positions;

retaining means supported by the enclosure-engaging frame for moving between an in position and an out position;

drivable means associated with the enclosure-engaging frame for driving the interrupter-engaging frame and interrupter between the extended and retracted positions in response to drive power supplied by a drive input;

the support assembly and interrupter being sized for removable passage through the front opening while the retaining means is positioned in the in position, wherein the retaining means cooperates with the enclosure while positioned in the out position the releasably retaining the enclosure-engaging frame stationary relative to the conductor terminals such that driving the interrupter-engaging frame between the extended and retracted positions respectively positively moves the interrupter between electrically coupled and uncoupled relationships with the conductor terminals; and retracted-position interlock means associated with the enclosure-engaging frame for permitting operation of the retaining means while the interrupter-engaging frame and releasably attached interrupter are positioned in the retracted position, and for precluding operation of the retaining means while the interrupter-engaging frame and releasably attached interrupter are positioned in the extended position, said retaining means comprising a flange traversed by a lock-opening, the flange being slidably supported by the enclosure-engaging frame reversibly between positions corresponding to the out position and the in position of the retaining means, said retracted-position interlock means comprising an obstructing lever pivotally supported by the enclosure-engaging frame and driven between a position engaging the lock-opening and a position of disengagement from the lock-opening in response to the interrupter-engaging frame being positioned in the extended and retractable positions respectively, said obstructing lever precluding the retaining means from changing position from the out position while the obstructing lever is positioned engaging the lock-opening,.

4. A support assembly for removably mounting a circuit interrupter in an enclosure, the enclosure defining conductor-terminal openings through which conductor terminals extend and a front opening providing access to the conductor terminals, the support assembly comprising:

an enclosure-engaging frame;

an interrupter-engaging frame that is releasably attached to the interrupter and is movably coupled to the enclosure-engaging frame for relative movement between extended and retracted positions;

retaining means supported by the enclosure-engaging frame for moving between an in position and an out position;

drivable means associated with the enclosure-engaging frame the driving the interrupter-engaging frame and interrupter between the extended and retracted positions in response to drive power supplied by a drive input;

the support assembly and interrupter being sized for removable passage through the front opening while the retaining means is positioned in the in position, wherein the retaining means cooperates with the enclosure while positioned in the out position for releasably retaining the enclosure-engaging frame stationary relative to the conductor terminals such that driving the interrupter-engaging frame between the extended and retracted positions respectively positively moves the interrupter between electrically coupled, and uncoupled relationships with the conductor terminals; and tripping-disabling interlock means for cooperating with said circuit interrupter, wherein said circuit interrupter is of the type that has a tripping-disabling switch with a follower that is normally biased to an enabling position and is actuable to a tripping-disabling position, said tripping-disabling interlock means being associated with the enclosure-engaging frame tier driving the follower to the tripping-disabling position while the interrupter-engaging frame is positioned intermediate of the extended and retracted positions, and for permitting the follower to return to the enabling position while the interrupter-engaging frame is positioned at the extended and retracted positions, said tripping-disabling interlock comprising a flange supported by the enclosure-engaging frame extending generally in the front to back direction, said flange defining a plane that contains the follower while the follower as carried by the interrupter moves back and forth between the extended and retracted positions, said flange having an edge disposed for engaging the follower and being recessed with two notches through the edge on opposite sides of a central segment, said follower following the edge and is actuated to the tripping-disabling position while following the central segment and is permitted to return to the enabling position while disposed in the notches.

5. A support assembly for removably mounting a circuit interrupter in an enclosure, the enclosure defining conductor-terminal openings through which conductor terminals extend and a front opening providing access to the conductor terminals, the support assembly comprising:

an enclosure-engaging frame;

an interrupter-engaging frame that is releasably attached to the interrupter and is movably coupled to the enclosure-engaging frame for relative movement between extended and retracted positions;

retaining means supported by the enclosure-engaging frame for moving between an in position and an out position;

drivable means associated with the enclosure-engaging frame for driving the interrupter-engaging frame and interrupter between the extended and retracted positions in response to drive power supplied by a drive input;

the support assembly and interrupter being sized for removable passage through the front opening while the retaining means is positioned in the in position, wherein the retaining means cooperates with the enclosure while positioned in the out position the releasably retaining the enclosure-engaging frame stationary relative to the conductor terminals such that driving the interrupter-engaging frame between the extended and retracted positions respectively positively moves the interrupter between electrically coupled and uncoupled relationships with the conductor terminals; and tripping-disabling interlock means for cooperating with said circuit interrupter, wherein said circuit interrupter is of the type that has a tripping-disabling switch that is normally biased to an enabling position and is actuable to a tripping-disabling position, said tripping-disabling interlock means being associated with the enclosures-engaging frame for activating the switch to the tripping disabling position while the enclosure-engaging frame is being withdrawn from the enclosure, said tripping-disabling interlock means comprising an enclosure-engaging follower movably supported by the enclosure-engaging frame the movement between a normally biased position and a tripped position, the follower actuating the switch to the tripping-disabling position as the follower moves to the tripped position, said follower following a cam surface associated with the enclosure while the enclosure-engaging frame is being withdrawn, the cam surface causing the follower to move to the tripped position as the enclosure-engaging frame is being withdrawn, said follower comprising a roller, said enclosure having a floor defining the cam surface with a ridge in the pathway of the roller.

* * * * *